(12) United States Patent
Kawamoto

(10) Patent No.: US 7,511,869 B2
(45) Date of Patent: Mar. 31, 2009

(54) OPTICAL SCANNING DEVICE

(75) Inventor: Tomohiro Kawamoto, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 46 days.

(21) Appl. No.: 11/872,550

(22) Filed: Oct. 15, 2007

(65) Prior Publication Data

US 2008/0151344 A1 Jun. 26, 2008

(30) Foreign Application Priority Data

Dec. 20, 2006 (JP) ............................. 2006-342824

(51) Int. Cl.
*G02B 26/08* (2006.01)
*H01J 3/14* (2006.01)
(52) U.S. Cl. ...................... 359/216; 250/236
(58) Field of Classification Search .......... 359/216–219
See application file for complete search history.

(56) References Cited

U.S. PATENT DOCUMENTS 5,245,181 A * 9/1993 Cho .......................... 250/236

FOREIGN PATENT DOCUMENTS

| JP | 58-100118 B | 6/1983 |
|---|---|---|
| JP | 60-229006 B | 11/1985 |
| JP | 09-314901 A | 9/1997 |
| JP | 2001-270153 A | 10/2001 |
| JP | 2004-037757 A | 2/2004 |

* cited by examiner

*Primary Examiner*—James Phan
(74) *Attorney, Agent, or Firm*—Canon U.S.A., Inc. I.P. Division

(57) ABSTRACT

An optical scanning device includes a beam generating unit configured to generate a beam of light, a scanning unit with a plurality of scanning planes configured to deflect the beam of light generated by the beam generating unit and cause the beam of light to scan an image carrier in a main-scanning direction, a micro mirror configured to deflect the beam of light generated by the beam generating unit and thereby enable the deflected beam of light to fall on the scanning unit, a position detecting unit configured to detect a position of the beam of light deflected by the micro mirror, an input voltage control unit configured to control an input voltage value for inclining the micro mirror and thereby causing the beam of light to deflect, and an input voltage determining unit configured to control the input voltage value controlled by the input voltage control unit.

5 Claims, 12 Drawing Sheets

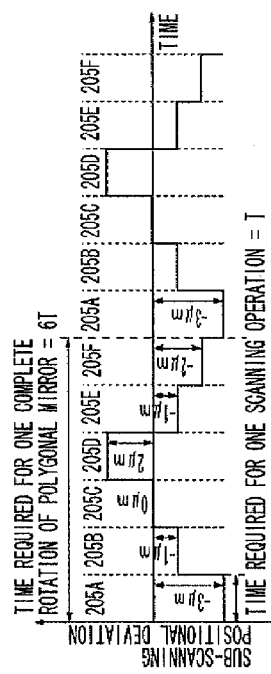
FIG. 9A PRIOR ART
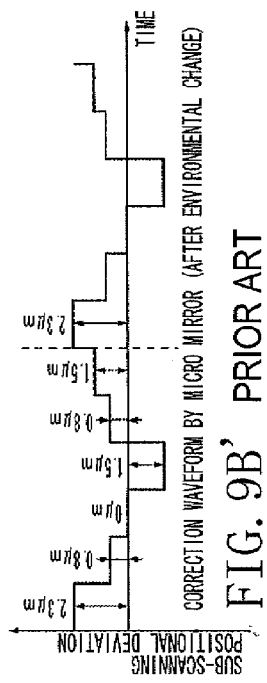
FIG. 9B' PRIOR ART
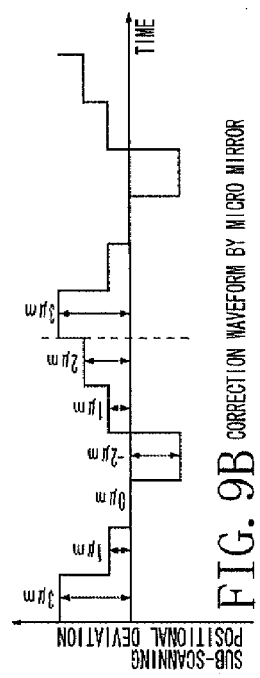
FIG. 9B PRIOR ART
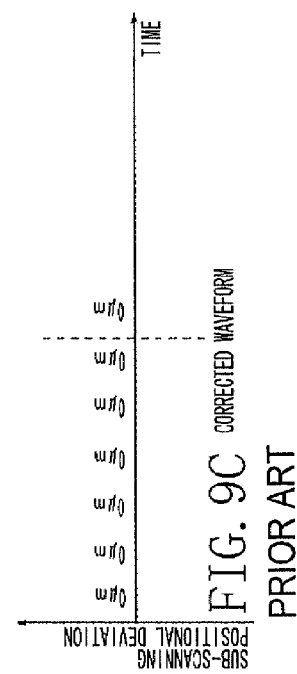
FIG. 9C' PRIOR ART
FIG. 9C PRIOR ART

OPTICAL SCANNING DEVICE

BACKGROUND OF THE INVENTION

1. Field of the Invention

The present invention relates to an optical scanning device which is configured to adjust a micro mirror incorporated in the device.

2. Description of the Related Art

The optical scanning device incorporated in an electrophotographic image forming apparatus can use a polygonal mirror that deflects a beam of light and causes the beam to repeatedly scan a photosensitive drum to form an electrostatic latent image on the photosensitive drum. The photosensitive drum is an image carrier that can rotate at a constant speed. A scanning operation in a longitudinal direction of the photosensitive drum is referred to as main scanning. The electrostatic latent image of a line formed in a main scanning operation is referred to as main scanning line.

There is a problem that the clearance (pitch) between main scanning lines is not uniform when the lines are formed on a photosensitive drum with a beam of light. This is referred to as pitch unevenness (or irregularity)

One of the reasons is that an actual rotational speed of the photosensitive drum is not constant. This is referred to as "rotation unevenness." Another reason is that the tilt angle of each plane of a polygonal mirror is not uniform due to manufacturing errors. This is referred to as "plane tilt."From these reasons, the scanning position of a light beam on a photosensitive drum tends to deviate.

As discussed in Japanese Patent Application Laid-Open No. 2004-37757, to solve the above-described problem, a conventional system uses a micro mirror that is disposed in optical path and can slant in a sub-scanning direction (i.e., a direction normal to the main-scanning direction). This system can correct the pitch unevenness of main scanning lines by adjusting the inclination of the micro mirror.

As discussed in Japanese Patent Application Laid-Open No. 2001-270153, a multi-beam image forming apparatus includes a galvanometer mirror that can correct a positional deviation between light beams. This apparatus can operate in a specific mode for adjusting an angle of inclination of the galvanometer mirror to eliminate a deviation if caused in both the main-scanning direction and the sub-scanning direction due to effects of drift.

The correction amount required for correcting the plane tilt of a polygonal mirror is different for each plane. Therefore, the number of angles of inclination of a micro mirror to be set for adjustment is equal to the number of planes of the polygonal mirror.

FIG. 8 illustrates an exemplary polygonal mirror 205 that has six reflection planes defined by a plane tilt profile described below. The first plane 205A has a tilt amount of −3 μm. The second plane 205B has a tilt amount of −1 μm. The third plane 205C has a tilt amount of 0 μm. The fourth plane 205D has a tilt amount of 2 μm. The fifth plane 205E has a tilt amount of −1 μm. The sixth plane 205F has a tilt amount of −2 μm.

In the expression of the plane tilt, the tilt amount indicates a deviation caused by the plane tilt of the polygonal mirror 205. For example, the expression "tilt amount of 2 μm" indicates that a light spot formed on a photosensitive drum deviates from a reference position (i.e., ideal position) in the sub-scanning direction by an amount of +2 μm.

FIG. 9A is a graph illustrating a time sequential deviation in the sub-scanning position relative to the reference position (i.e., ideal position), according to the polygonal mirror 205 having the plane tilt profile illustrated in FIG. 8. T represents the period of time required for a main scanning operation. One complete rotation (i.e., rotation of 360°) of the polygonal mirror 205 requires the time of 6 T (=6 planes×T) in total.

When the scanning operation uses the first plane 205A, the sub-scanning position (i.e., the position of the light spot formed on a photosensitive drum) deviates from the reference position by an amount of −3 μm, due to the plane tilt of the polygonal mirror 205. After time elapse of T, when the scanning operation uses the second plane 205B, the sub-scanning position deviates from the reference position by an amount of −1 μm. After time elapse of T, when the scanning operation uses the third plane 205C, the sub-scanning position coincides with the reference position.

Furthermore, after time elapse of T, when the scanning operation uses the fourth plane 205D, the sub-scanning position deviates from the reference position by an amount of 2 μm. After time elapse of T, when the scanning operation uses the fifth plane 205E, the sub-scanning position deviates from the reference position by an amount of −1 μm. After time elapse of T, when the scanning operation uses the sixth plane 205F, the sub-scanning position deviates from the reference position by an amount of −2 μm. In this manner, the sub-scanning position deviates time-sequentially during one complete rotation of the polygonal mirror 205 that requires the time of 6 T in total.

To correct the sub-scanning positional deviation (i.e., effects of plane tilt) illustrated in FIG. 9A, it is useful to slant (incline) the micro mirror at a predetermined angle of inclination at which the effects of the plane tilt of the polygonal mirror can be cancelled. Namely, as illustrated in FIG. 9B, the inclination of the micro mirror can be adjusted so that a beam of light, after it falls on the polygonal mirror, generates a deviation opposed to the sub-scanning positional deviation illustrated in FIG. 9A. FIG. 9C illustrates an ideal state where the deviation in the sub-scanning position is completely suppressed.

However, the above-described correction system is subjected to the following problems. The micro mirror is not free from effects of environmental changes (e.g., ambient temperature change as well as temperature change of the micro mirror itself). The angle of inclination of a micro mirror changes according to a temperature change as illustrated in FIG. 9B'. Namely, if any change occurs in the environmental conditions, the micro mirror cannot hold its angle of inclination at a desired value (i.e., an angle to be set in response to an applied input voltage) when the input voltage corresponding to the correction illustrated in FIG. 9B is applied to the micro mirror. FIG. 9C' illustrates a state where the deviation in the sub-scanning position is not completely removed.

The above-described problem (i.e., the angle of inclination of a micro mirror deviates from an ideal angle corresponding to a specific input voltage due to environmental change) is described below in more detail. When the scanning operation uses the first plane 205A of the polygonal mirror 205, even if an input voltage corresponding to the tilt amount of +3 μm is applied to the micro mirror, an actual sub-scanning positional deviation becomes +2.3 μm due to the environmental change. Similarly, when the scanning operation uses the second plane 205B, an actual sub-scanning positional deviation becomes 0.8 μm if the input voltage corresponding to the tilt amount of 1 μm is applied to the micro mirror.

When the scanning operation uses the third plane 205C, an actual sub-scanning positional deviation becomes 0 μm (because the third plane 205C requires no correction). When the scanning operation uses the fourth plane 205D, an actual sub-scanning positional deviation becomes −1.5 μm. When the scanning operation uses the fifth plane 205E, an actual sub-scanning positional deviation becomes 0.8 µm. When the scanning operation uses the sixth plane 205F, an actual sub-scanning positional deviation becomes 1.5 µm.

Namely, according to the example of FIG. 9B', if any change occurs in the environmental conditions, the angle of inclination of a micro mirror decreases compared to an angle of inclination to be obtained when an input voltage is applied before the environmental conditions change, even if the micro mirror slants (inclines) in response to the input voltage so as to eliminate a plane tilt amount of the polygonal mirror.

Therefore, as illustrated in FIG. 9C', when the scanning operation uses the first plane 205A of the polygonal mirror 205, an error of −0.7 µm is generated in the sub-scanning positional deviation. When the scanning operation uses the second plane 205B, an error of −0.2 µm is generated in the sub-scanning positional deviation. When the scanning operation uses the third plane 205C, no error is generated in the sub-scanning positional deviation (because the third plane 205C requires no correction).

When the scanning operation uses the fourth plane 205D, an error of 0.5 µm is generated in the sub-scanning positional deviation. When the scanning operation uses the fifth plane 205E, an error of −0.2 µm is generated in the sub-scanning positional deviation. When the scanning operation uses the sixth plane 205F, an error of −0.5 µm is generated in the sub-scanning positional deviation. In this manner, the conventional correction system cannot sufficiently correct the sub-scanning positional deviation.

SUMMARY OF THE INVENTION

Exemplary embodiments, features and aspects of the present invention are directed to an optical scanning device capable of sufficiently correcting a sub-scanning positional deviation even when environmental conditions change.

According to an aspect of the present invention, an optical scanning device includes a beam generating unit configured to generate a beam of light, a scanning unit with a plurality of scanning planes configured to deflect the beam of light generated by the beam generating unit and cause the beam of light to scan an image carrier in a main-scanning direction, a micro mirror configured to deflect the beam of light generated by the beam generating unit and thereby enable the deflected beam of light to fall on the scanning unit, a position detecting unit configured to detect a position of the beam of light deflected by the micro mirror, an input voltage control unit configured to control an input voltage value for inclining the micro mirror and thereby causing the beam of light to deflect, and an input voltage determining unit configured to control the input voltage value controlled by the input voltage control unit according to a detection result obtained by the position detecting unit.

The exemplary embodiments of the present invention can provide an optical scanning device that can sufficiently correct the sub-scanning positional deviation regardless of change in environmental conditions.

If there are two or more angles of inclination to be used for image formation, a tilt adjustment can be performed for only a representative angle of inclination. The time required for adjusting the angle of inclination of a micro mirror can be reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 9A is a graph illustrating a time sequential deviation in a sub-scanning position according to the polygonal mirror having the plane tilt profile illustrated in FIG. 8.

FIG. 9B is a graph illustrating a time sequential waveform of a correction using a micro mirror for correcting the sub-scanning positional deviation illustrated in FIG. 9A.

FIG. 9C is a graph illustrating a time sequential deviation in the sub-scanning position after the sub-scanning positional deviation illustrated in FIG. 9A is corrected using the correction waveform of FIG. 9B.

FIG. 9B' is a graph illustrating a time sequential waveform of a correction using a micro mirror for correcting the sub-scanning positional deviation illustrated in FIG. 9A, in a case where an environmental change occurs.

FIG. 9C' is a graph illustrating a time sequential deviation in the sub-scanning position after the sub-scanning positional deviation illustrated in FIG. 9A is corrected using the correction waveform of FIG. 9B'.

DETAILED DESCRIPTION OF THE EMBODIMENTS

Figure 1:
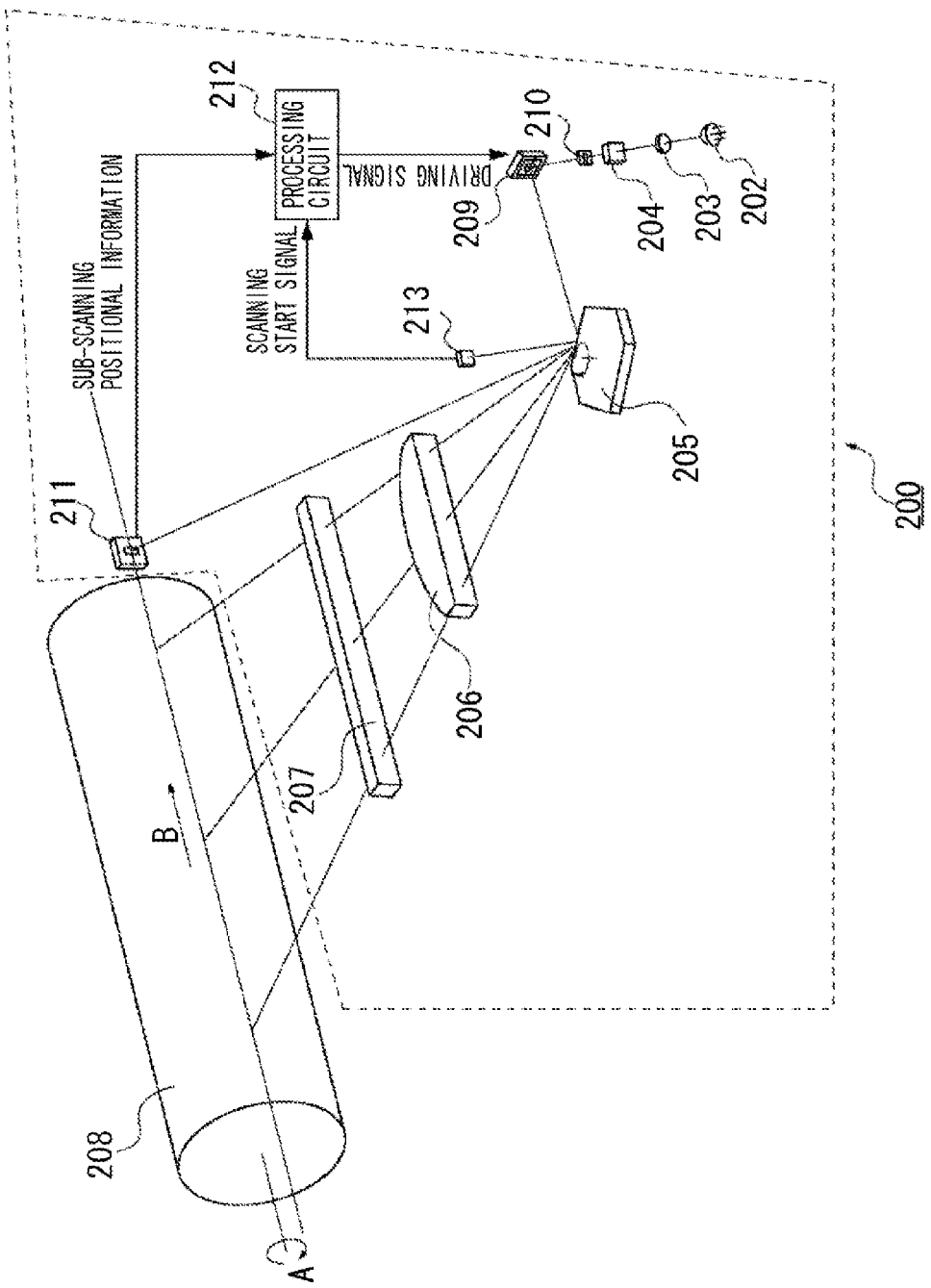
FIG. 1 illustrates an example optical scanning device used in an image forming apparatus, according to an aspect of an exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus, once an item is described in one figure, it may not be discussed for following figures.

It is noted that the exemplary optical scanning devices according to the present invention are employable in an electrophotographic image forming apparatus.

First Exemplary Embodiment

FIG. 1 illustrates an optical scanning device of an image forming apparatus according to a first exemplary embodiment of the present invention. An optical scanning device 200 includes a light source 202, a collimator lens 203, a cylindrical lens 204, a rotary polygonal mirror 205, an fθ lens 206, a lens dose equivalent (LDE) lens 207, a micro mirror 209, a beam shaping slit 210, a position detection sensor 211, a processing circuit 212, and a light detecting sensor (i.e., beam detection (BD) sensor) 213.

A beam of light from the light source 202, such as a semiconductor laser, passes through the collimator lens 203, the cylindrical lens 204, and the beam shaping slit 210 successively, and falls on the rotary polygonal mirror 205 via the micro mirror 209.

The beam of light reflects on the polygonal mirror 205 and passes through the fθ lens 206 and the LDE lens 207. The beam of light scans a photosensitive drum 208 in an arrow direction B (i.e., main-scanning direction) which is the longitudinal direction of the photosensitive drum 208. The photosensitive drum 208 rotates in an arrow direction A (i.e., sub-scanning direction). The optical scanning device repeats the above-described operations to successively form electrostatic latent images in the rotational direction (arrow direction A) of the photosensitive drum 208.

The processing circuit 212 receives sub-scanning positional information (i.e., detection result of a position of the main scanning line) obtained by the position detection sensor 211 and a scanning start signal obtained by the light detecting sensor 213. The position detection sensor 211 is positioned near the photosensitive drum 208. The processing circuit 212 generates a drive signal based on the sub-scanning positional information and the scanning start signal and outputs the drive signal to the micro mirror 209. The detection signal of the light detecting sensor 213 can be used as a sync signal for synchronizing the rotation of the polygonal mirror 205 with the data writing to the photosensitive drum 208 with a beam of light.

Figure 2A:
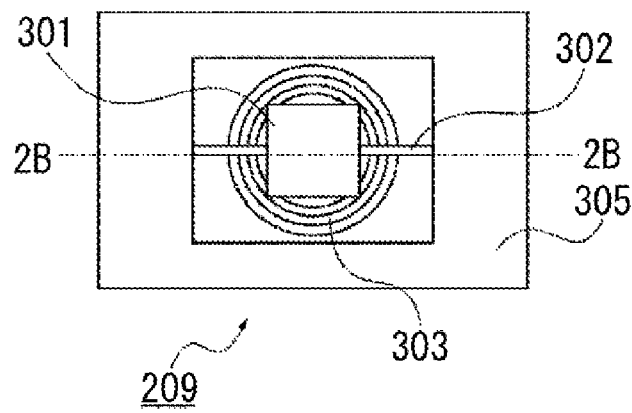
FIG. 2A is a plan view of an exemplary micro mirror, according to an aspect of the present invention.
Figure 2B:
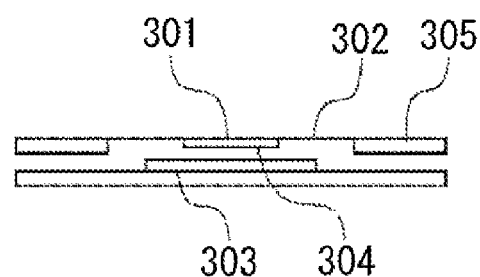
FIG. 2B is a cross-sectional view of the micro mirror taken along a line 2B-2B of FIG. 2A, according to an aspect of the present invention.
Figure 2C:
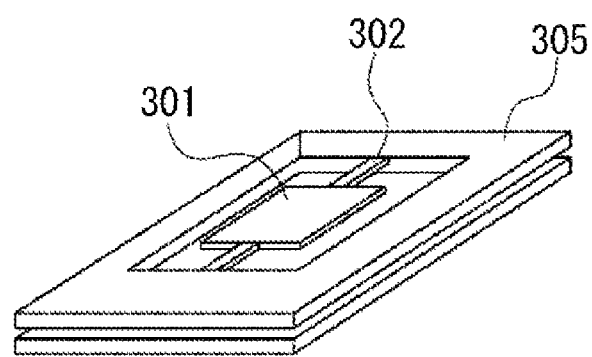
FIG. 2C is a perspective view of the micro mirror illustrated in FIG. 2A, according to an aspect of the present invention.

FIGS. 2A to 2C illustrate a detailed configuration of the micro mirror 209. FIG. 2A is a plan view of the micro mirror 209. FIG. 2B is a cross-sectional view of the micro mirror 209 taken along a line 2B-2B of FIG. 2A. FIG. 2C is a perspective view of the micro mirror 209.

As illustrated in FIGS. 2A to 2C, the micro mirror 209 includes a mirror 301, a torsion bar 302, a coil 303, a magnet 304, and a frame body 305. The magnet 304 is attached to a reverse surface of the mirror 301. The torsion bar 302 supports an integrated set of the mirror 301 and the magnet 304 to a frame body 305. The coil 303, provided at a position opposed to the magnet 304, can generate a magnetic field in response to driving current supplied to the coil 303. The torsion bar 302 allows the mirror 301 to slant (incline) when the generated magnetic field interacts with the magnet 304.

The micro mirror 209 can change an inclined angle (i.e., angle of inclination) of the mirror 301 according to an input voltage supplied from the processing circuit 212. The micro mirror 209 according to the present exemplary embodiment has performances comparable to those of an electrostatic drive resonance micro mirror that can be fabricated using a general semiconductor process.

Figure 3:
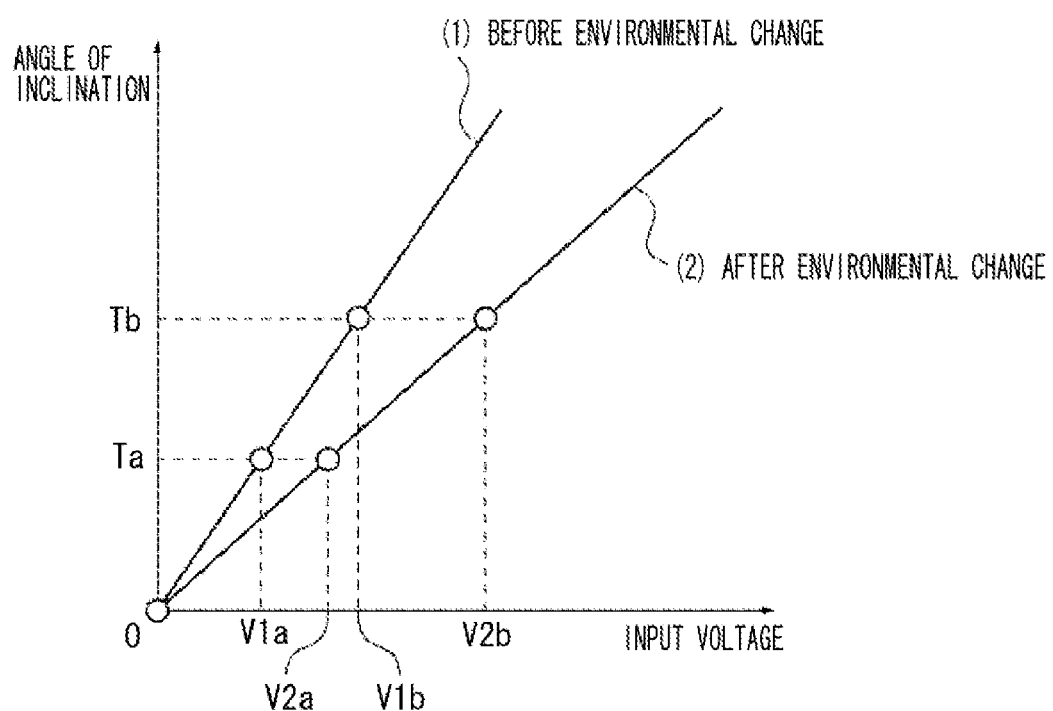
FIG. 3 is a graph illustrating exemplary characteristics of a micro mirror, according to an aspect of the present invention.

FIG. 3 illustrates an exemplary linear relationship between the input voltage and the inclination of the micro mirror 209. As illustrated in FIG. 3, the angle of inclination of the micro mirror 209 increases in proportion to the input voltage.

The line (1) represents a gradient-voltage relationship obtained before environmental conditions change, according to which the angle of inclination of the micro mirror 209 is Ta when the input voltage is V1a. The angle of inclination increases to Tb (>Ta) when the input voltage increases to V1b (>V1a). The line (2) represents a gradient-voltage relationship obtained after environmental conditions change, e.g., when the ambient temperature or the micro mirror temperature changes. The angle of inclination of the micro mirror 209 is Ta when the input voltage is V2a, and the angle of inclination increases to Tb when the input voltage increases to V2b. Thus, a relationship V2b/V1b=V2a/V1a is satisfied.

Accordingly, if a change rate between "before environmental change (1)" and "after environmental change (2)" in the input voltage value corresponding to the angle of inclination Tb is known, an input voltage value required for obtaining the angle of inclination Ta after the environmental change (2) can be calculated.

Figure 4:
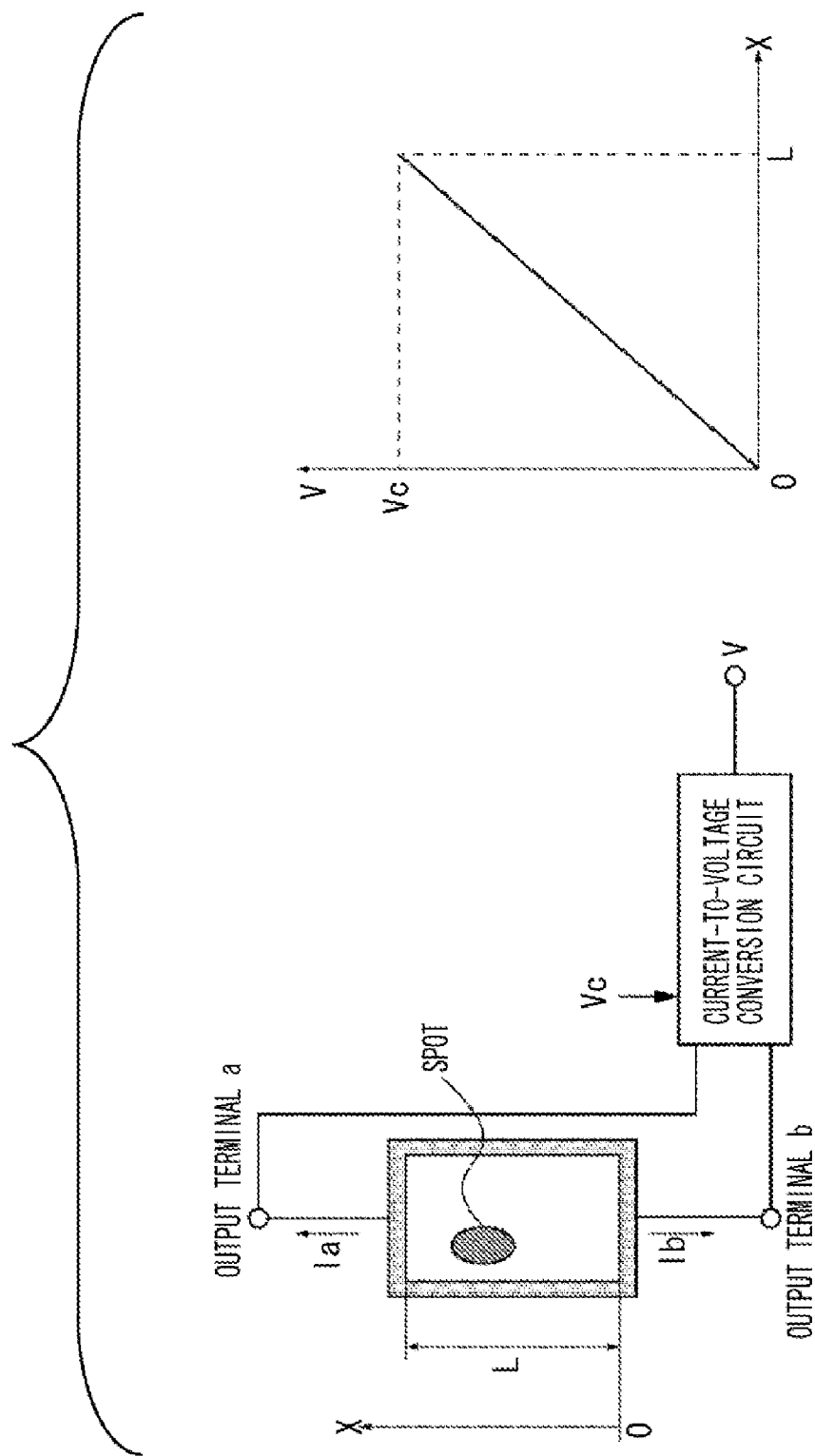
FIG. 4 illustrates an exemplary position sensing device (PSD) and its operation, according to an aspect of the present invention.

In the present exemplary embodiment, the position detection sensor 211 includes a position sensing device (PSD) FIG. 4 illustrates an exemplary position sensing device (PSD) of the position detection sensor 211 according to the present exemplary embodiment. The PSD is configured to output current values Ia and Ib from its output terminals "a" and "b" according to the position of a light beam spot on the PSD. In other words, the current values Ia and Ib are information relating to the position of irradiation. A current-to-voltage conversion circuit converts the current values Ia and Ib into voltage values. The processing circuit 212 identifies the position of irradiation (i.e., the position of a light beam spot) based on the voltage values.

The torsion bar 302 of the micro mirror 209 is parallel to the main-scanning direction. The micro mirror 209 can deflect a beam of light in the sub-scanning direction (i.e., the direction normal to the main-scanning direction).

The processing circuit 212 changes the angle of inclination of the micro mirror 209 in synchronism with the deviation in the sub-scanning direction, for example, deviation in the plane tilt of the polygonal mirror 205. More specifically, when the polygonal mirror 205 has the plane tilt illustrated in FIG. 9A, the processing circuit 212 controls the angle of inclination of the micro mirror 209 for each plane of the polygonal mirror 205. Namely, the processing circuit 212 generates the opposite sub-scanning positional deviation illustrated in FIG. 9B that can cancel the plane tilt of the micro mirror 209.

Figure 8:
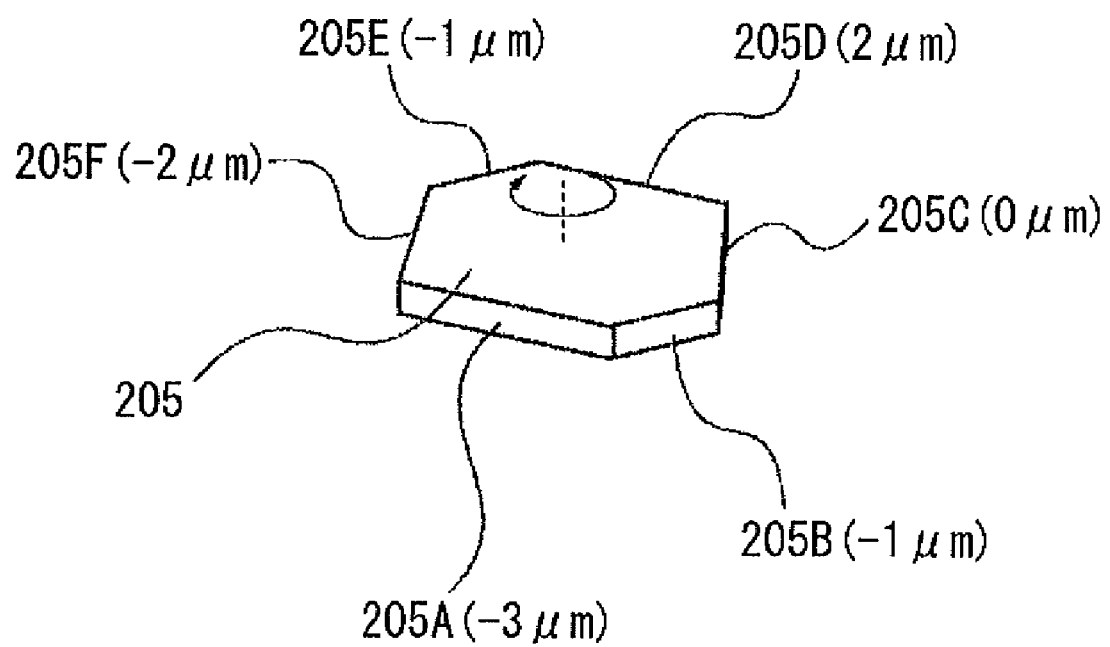
FIG. 8 illustrates an exemplary plane tilt profile of a polygonal mirror.

As described above, FIG. 9A illustrates a time sequential deviation in the sub-scanning position caused by the polygonal mirror 205 having the plane tilt profile illustrated in FIG. 8. In FIG. 9A, the ordinate represents a deviation from a sub-scanning reference position and the abscissa represents the time. When T represents the period of time in a main scanning operation, one complete rotation (i.e., rotation of 360°) of the polygonal mirror 205 requires the total time of 6 T (=6 planes×T).

In the present exemplary embodiment, the reference position indicates a scanning position of a light beam when the polygonal mirror 205 has no plane tilt and the micro mirror 209 does not incline.

When the scanning operation uses the first plane 205A, the sub-scanning position (i.e., the position of the light spot formed on a photosensitive drum) deviates from the reference position by an amount of −3 μm, due to the plane tilt of the polygonal mirror 205. After time elapse of T, when the scanning operation uses the second plane 205B, the sub-scanning position deviates from the reference position by an amount of −1 μm. After time elapse of T, when the scanning operation uses the third plane 205C, the sub-scanning position coincides with the reference position.

Furthermore, after time elapse of T, when the scanning operation uses the fourth plane 205D, the sub-scanning position deviates from the reference position by an amount of 2 μm. After time elapse of T, when the scanning operation uses the fifth plane 205E, the sub-scanning position deviates from the reference position by an amount of −1 μm. After time elapse of T, when the scanning operation uses the sixth plane 205F, the sub-scanning position deviates from the reference position by an amount of −2 μm. In this manner, the sub-scanning position deviates time-sequentially during one complete rotation of the polygonal mirror 205 that requires the total time of 6 T.

To correct the sub-scanning positional deviation (i.e., effects of plane tilt) illustrated in FIG. 9A, the processing circuit 212 drives the micro mirror 209 in a similar manner. More specifically, as illustrated in FIG. 9B, the processing circuit 212 inclines the micro mirror 209 to deflect a beam of light in a direction capable of generating a deviation opposed to the sub-scanning positional deviation illustrated in FIG. 9A. When the scanning operation uses the first plane 205A, the processing circuit 212 inclines the micro mirror 209 to a predetermined angle suitable for generating a deviation of +3 μm from the reference position. After time elapse of T, when the scanning operation uses the second plane 205B, the processing circuit 212 inclines the micro mirror 209 to a predetermined angle for generating a deviation of +1 μm from the reference position. Similarly, the processing circuit 212 inclines the micro mirror 209 to an optimum angle for each of the third to sixth planes.

FIG. 9C illustrates a result of the correction illustrated in FIG. 9B. As illustrated in FIG. 9C, the sub-scanning positional deviation generated by the plane tilt of the polygonal mirror 205 can be cancelled by controlling the inclination of the micro mirror 209 that can generate the opposite sub-scanning positional deviation.

However, the micro mirror is not free from effects of environmental changes (e.g., ambient temperature change as well as temperature change of the micro mirror itself). The angle of inclination of a micro mirror changes according to a temperature change as illustrated in FIG. 9B'. Namely, if any change occurs in the environmental conditions, the micro mirror cannot hold its angle of, inclination at a desired value (i.e., an angle to be set in response to an applied input voltage) when the input voltage corresponding to the correction illustrated in FIG. 9B is applied to the micro mirror.

The above-described problem (i.e., the angle of inclination of a micro mirror deviates from an ideal angle corresponding to a specific input voltage due to environmental change) is described below in more detail.

When the scanning operation uses the first plane 205A of the polygonal mirror 205, even if an input voltage corresponding to the tilt amount of +3 μm is applied to the micro mirror 209, an actual sub-scanning positional deviation becomes +2.3 μm due to the environmental change. Similarly, when the scanning operation uses the second plane 205B, an actual sub-scanning positional deviation becomes 0.8 μm if the input voltage corresponding to the tilt amount of 1 μm is applied to the micro mirror 209. When the scanning operation uses the third plane 205C, an actual sub-scanning positional deviation becomes 0 μm (because the third plane 205C requires no correction).

When the scanning operation uses the fourth plane 205D, an actual sub-scanning positional deviation becomes −1.5 μm. When the scanning operation uses the fifth plane 205E, an actual sub-scanning positional deviation becomes 0.8 μm. When the scanning operation uses the sixth plane 205F, an actual sub-scanning positional deviation becomes 1.5 μm.

Namely, according to the example of FIG. 9B', if any change occurs in the environmental conditions, the angle of inclination of the micro mirror 209 decreases compared to an angle of inclination to be obtained when an input voltage is applied before the environmental conditions change, even if the micro mirror 209 slants (inclines) in response to the input voltage so as to eliminate a plane tilt amount of the polygonal mirror.

Therefore, as illustrated in FIG. 9C', when the scanning operation uses the first plane 205A of the polygonal mirror 205, an error of −0.7 μm is generated in the sub-scanning positional deviation. When the scanning operation uses the second plane 205B, an error of −0.2 μm is generated in the sub-scanning positional deviation. When the scanning operation uses the third plane 205C, no error is generated in the sub-scanning positional deviation (because the third plane 205C requires no correction).

When the scanning operation uses the fourth plane 205D, an error of 0.5 μm is generated in the sub-scanning positional deviation. When the scanning operation uses the fifth plane 205E, an error of −0.2 μm is generated in the sub-scanning positional deviation. When the scanning operation uses the sixth plane 205F, an error of −0.5 μm is generated in the sub-scanning positional deviation.

In this case, if the correction is continued, it is expected that the sub-scanning positional deviation generated by controlling the inclination of the micro mirror 209 can cancel the sub-scanning positional deviation caused by the plane tilt of the polygonal mirror 205.

However, an actual sub-scanning positional deviation generated by the micro mirror 209 is different by an amount of 0.7 μm from the sub-scanning positional deviation caused by the plane tilt of the polygonal mirror 205.

Figure 5:
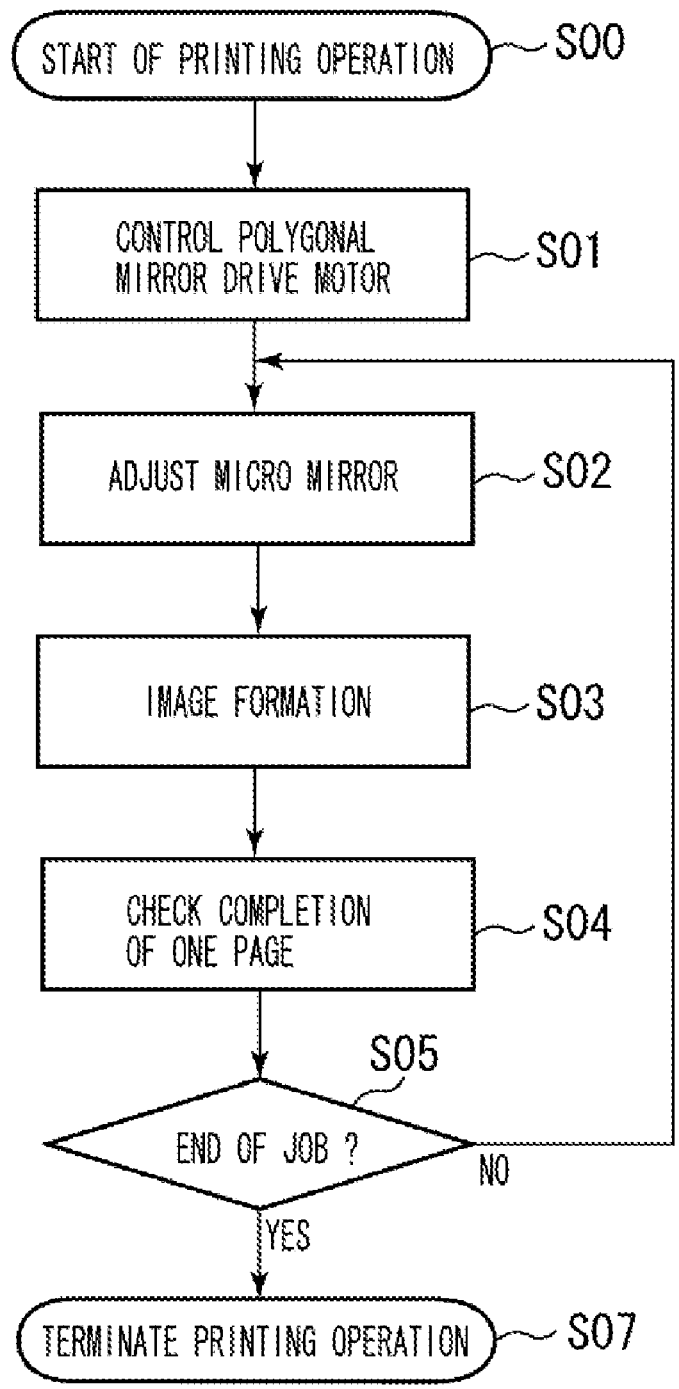
FIG. 5 is a flowchart illustrating an exemplary printing operation from start to end, according to an aspect of the present invention.
Figure 6:
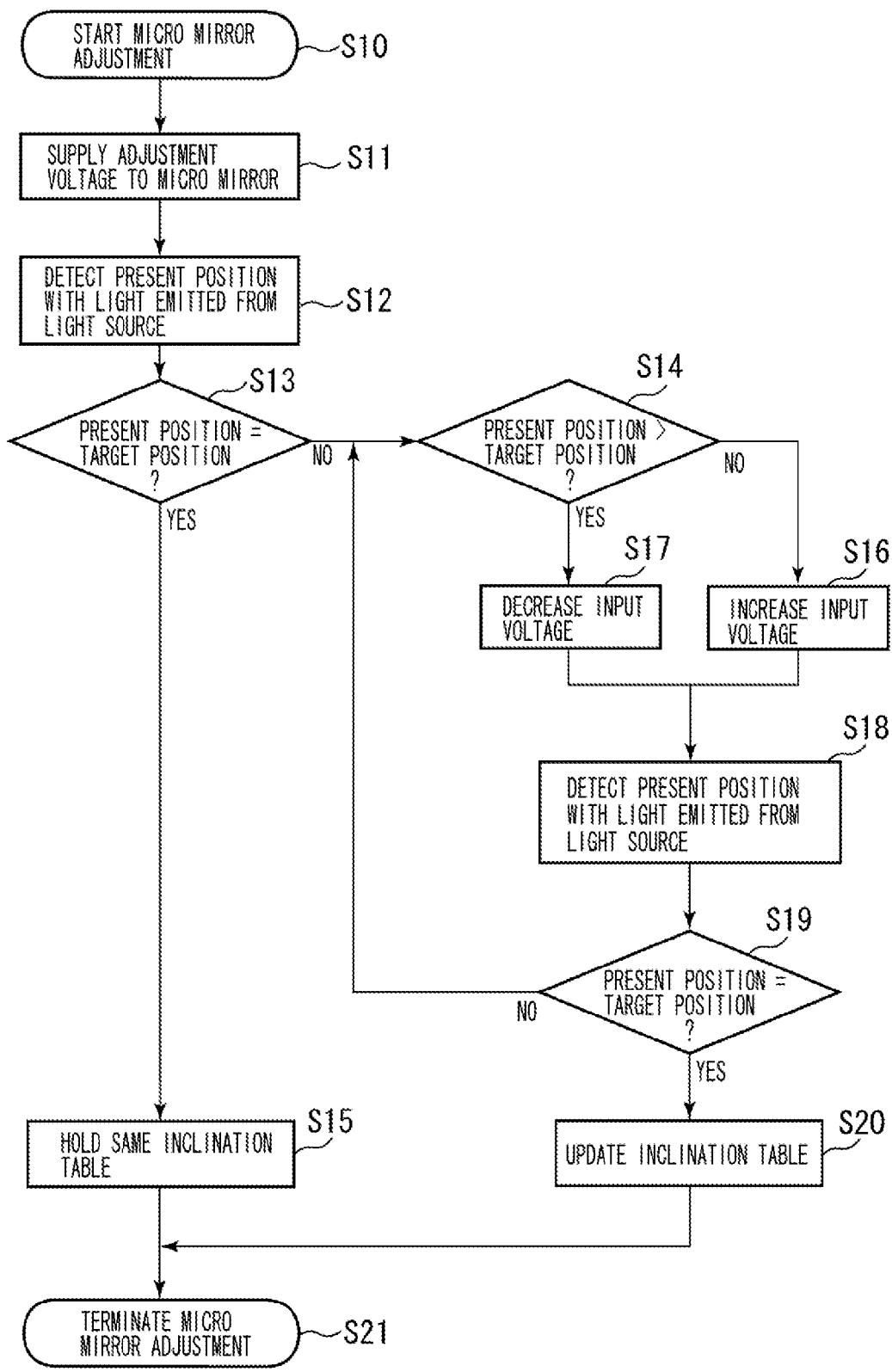
FIG. 6 is a flowchart illustrating an exemplary micro mirror adjusting operation, according to an aspect of the present invention.

FIG. 5 is a flowchart illustrating an exemplary printing operation from start to end. FIG. 6 is a flowchart illustrating an exemplary micro mirror adjusting operation (step S02 of FIG. 5).

To execute the processing of FIGS. 5 and 6, a central processing unit (CPU; not illustrated) of the optical scanning device controls various units according to a control program stored in a read only memory (ROM; not illustrated) with a random access memory (RAM; not illustrated) that functions as a work area.

Now referring to FIG. 5, in step S00, a user starts a print job. In step S01, the CPU activates a polygonal mirror drive motor that drives the polygonal mirror 205. Furthermore, the CPU turns the light source (laser) 202 on. A beam of light falls on the light detecting sensor 213. Then, the CPU controls a voltage value applied to the polygonal mirror drive motor so that the time interval of a detection signal (hereinafter, referred to as BD signal) obtained from the light detecting sensor 213 becomes equal to a target value. Thus, the polygonal mirror 209 rotates at a constant speed. In step S02, the CPU performs an operation for adjusting the angle of inclination of the micro mirror 209 (as described later with reference to the flowchart of FIG. 6).

In step S03, the CPU turns the light source 202 on according to an image signal and performs an image forming operation for forming an electrostatic latent image on a photosensitive drum 208. In this operation, the micro mirror 209 performs the above-described plane tilt correction. The micro mirror 209 changes its angle of inclination by an amount capable of canceling a plane tilt amount of each scanning plane of the polygonal mirror 205 when used for image formation.

In step S04, the CPU checks if the image formation of one page has completed. In step S05, the CPU determines whether the print job has terminated. If the CPU determines that the print job has terminated (YES in step S05), the processing flow proceeds to step S07. In step S07, the operation mode shifts to a standby mode. If the CPU determines that the print job has not yet terminated (NO in step S05), the processing flow returns to step S02 and the CPU performs the adjustment of the micro mirror 209.

As described above, the present exemplary embodiment adjusts the angle of inclination of the micro mirror 209 for each page to be printed. However, it may also be useful to perform the angle of inclination adjustment for the micro mirror 209 after completing one print job of plural pages (before starting the next print job). Furthermore, it may also be useful to perform the angle of inclination adjustment on a page-by-page basis only immediately after starting the image formation operation (e.g., from first to tenth pages) because the temperature change is steep. After the temperature change becomes small, it is useful to perform the angle of inclination adjustment on a job-by-job basis.

Figure 7:
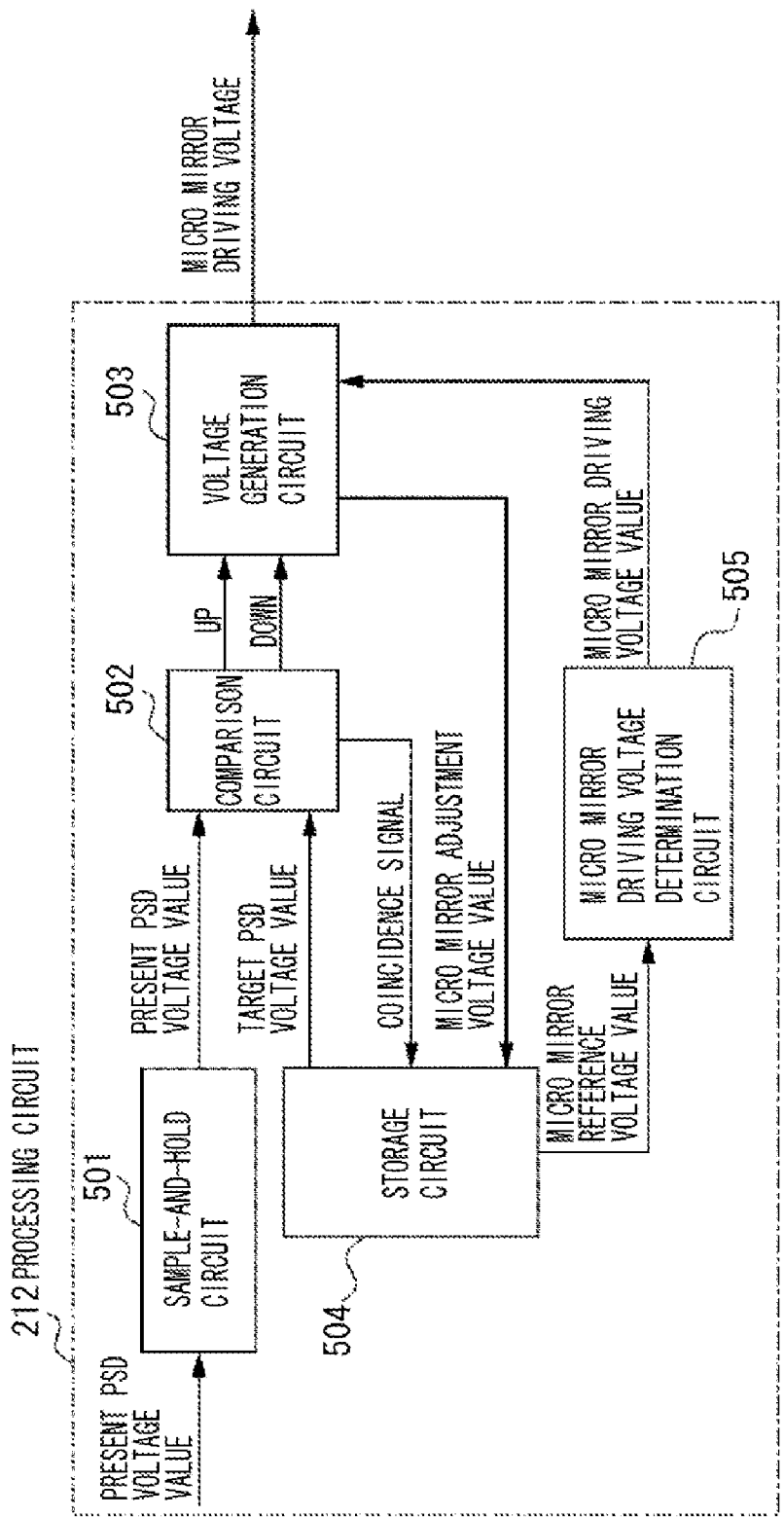
FIG. 7 is a block diagram illustrating an exemplary processing circuit that can adjust the angle of inclination of a micro mirror, according to an aspect of the present invention.

FIG. 7 is a block diagram illustrating an exemplary configuration of the processing circuit 212 that performs an operation for adjusting the angle of inclination of the micro mirror 209. The processing circuit 212 includes a sample-and-hold circuit 501, a comparison circuit 502, a voltage generation circuit 503, a storage circuit 504, and a micro mirror driving voltage determination circuit 505.

The sample-and-hold circuit 501 is configured to sample-and-hold an output voltage (i.e., PSD voltage value) of the above-described position detection sensor (PSD) 211 and output a hold value (i.e., PSD voltage value) to the comparison circuit 502. The comparison circuit 502 is configured to compare the present PSD voltage value received from the sample-and-hold circuit 501 with a target PSD voltage value received from the storage circuit 504.

If the present PSD voltage value is less than the target PSD voltage value, the comparison circuit 502 generates an UP signal that can increase the deflection angle. If the present PSD voltage value is greater than the target PSD voltage value, the comparison circuit 502 generates a DOWN signal that can decrease the deflection angle.

If the present PSD voltage value is equal to the target PSD voltage value (or if a difference between the present PSD voltage value and the target PSD voltage value is within a predetermined error range), the comparison circuit 502 outputs a coincidence signal to the storage circuit 504.

The voltage generation circuit 503 is configured to adjust (increase/reduce) a driving voltage of the micro mirror 209 according to the UP signal or the DOWN signal input from the comparison circuit 502, and is configured to output a micro mirror adjustment voltage value to the storage circuit 504.

The storage circuit 504 is configured to store a target value of the PSD voltage value (i.e., target PSD voltage value) and output the stored target PSD voltage value to the comparison circuit 502. Furthermore, the storage circuit 504 is configured to rewrite the presently stored PSD target value to the micro mirror adjustment voltage value received from the voltage generation circuit 503 if the coincidence signal is input from the comparison circuit 502. Moreover, the storage circuit 504 is configured to output the rewritten voltage value as a micro mirror reference voltage value to the micro mirror driving voltage determination circuit 505.

The micro mirror driving voltage determination circuit 505 is configured to output a micro mirror driving voltage value to the voltage generation circuit 503.

Now referring to FIG. 6, in step S10 the processing circuit 212 starts the angle of inclination adjustment for the micro mirror 209. In step S11, the voltage generation circuit 503 supplies an adjustment voltage value to the micro mirror 209. The micro mirror 209 inclines by an amount corresponding to the adjustment voltage value. More specifically, the adjustment voltage value is the micro mirror driving voltage value determined by the micro mirror driving voltage determination circuit 505.

In step S12, the light source 202 turns on at the timing the scanning light falls on the position detection sensor 211. When a beam of light falls on the position detection sensor 211, the position detection sensor 211 generates a PSD voltage value representing the position of irradiation. The sample-and-hold circuit 501 holds the detected PSD voltage value even after the beam of light has passed the position detection sensor 211.

In step S13, the comparison circuit 502 receives the present PSD voltage value held by the sample-and-hold circuit 501 and the target PSD voltage value stored in the storage circuit 504. The comparison circuit 502 determines whether the present PSD voltage value is equal to the target PSD voltage value (or determines whether a difference between the present PSD voltage value and the target PSD voltage value is within a predetermined error range).

The present PSD voltage value held by the sample-and-hold circuit 501 is a PSD voltage value obtained in an actual driving operation of the micro mirror 209. The target PSD voltage value stored in the storage circuit 504 is a PSD voltage value obtained when the micro mirror 209 inclines by a predetermined angle.

Namely, if the present PSD voltage value is equal to the target PSD voltage value (or if the difference between the present PSD voltage value and the target PSD voltage value is within the predetermined error range), the comparison circuit 502 determines that the micro mirror 209 has a desired angle of inclination corresponding to the applied driving voltage value. Thus, the comparison circuit 502 outputs the coincidence signal to the storage circuit 504.

In step S15, the micro mirror driving voltage determination circuit 505 generates a micro mirror inclination table (e.g., the line (1) in FIG. 3 that represents the gradient-voltage relationship obtained before the environmental conditions change) based on the micro mirror reference voltage value received from the storage circuit 504. In this case, the storage circuit 504 stores the same contents. As a result, the micro mirror inclination table remains the same. And in step S21, the processing circuit 212 terminates the adjustment for the micro mirror 209.

If the present PSD voltage value is not equal to the target PSD voltage value (or if the difference between the present PSD voltage value and the target PSD voltage value is out of the predetermined error range) (NO in step S13), the processing flow proceeds to step S14 to determine whether the present PSD voltage value is greater than the target PSD voltage value.

If it is determined that the present PSD voltage value is not greater than the target PSD voltage value (NO in step S14), the irradiation spot of a light beam is lower than the target position. The processing flow proceeds to step S16. In step S16, the comparison circuit 502 outputs the UP signal to the voltage generation circuit 503. The micro mirror driving voltage generated from the voltage generation circuit 503 increases by a predetermined amount corresponding to the UP signal. The micro mirror 209 increases its angle of inclination.

If it is determined that the present PSD voltage value is greater than the target PSD voltage value (YES in step S14), the irradiation spot of a light beam is higher than the target position. The processing flow proceeds to step S17. In step S17, the comparison circuit 502 outputs the DOWN signal to the voltage generation circuit 503. The micro mirror driving voltage generated from the voltage generation circuit 503 decreases by a predetermined amount corresponding to the DOWN signal. The micro mirror 209 decreases its angle of inclination.

After the processing of step S16 or step S17 is terminated, the processing flow proceeds to step S18. In step S18, the light source 202 turns on at the timing the scanning light falls on the position detection sensor 211. When a beam of light falls on the position detection sensor 211, the position detection sensor 211 generates a PSD voltage value representing the position of irradiation. The sample-and-hold circuit 501 holds the detected PSD voltage value.

In step S19, the comparison circuit 502 receives the present PSD voltage value held by the sample-and-hold circuit 501 and the target PSD voltage value stored in the storage circuit 504. The comparison circuit 502 determines whether the present PSD voltage value is equal to the target PSD voltage value (or determines whether a difference between the present PSD voltage value and the target PSD voltage value is within a predetermined error range).

If the present PSD voltage value is equal to the target PSD voltage value (or if the difference between the present PSD voltage value and the target PSD voltage value is within the predetermined error range) (YES in step S19), the comparison circuit 502 outputs the coincidence signal to the storage circuit 504.

In step S20, the micro mirror driving voltage determination circuit 505 re-generates a micro mirror inclination table based on the micro mirror reference voltage value received from the storage circuit 504. In this case, the storage circuit 504 stores changed contents. As a result, the micro mirror inclination table is updated.

If the present PSD voltage value is not equal to the target PSD voltage value (or if the difference between the present PSD voltage value and the target PSD voltage value is out of the predetermined error range) (NO in step S19), the processing flow returns to step S14 to determine whether the present PSD voltage value is greater than the target PSD voltage value.

The processing circuit 212 repeatedly executes the processing of steps S14 to S19 until the present PSD voltage value agrees with the target PSD voltage value (or the difference between the present PSD voltage value and the target PSD voltage value decreases to the predetermined error range). If the determination in step S19 is positive, the processing flow proceeds to step S20.

In step S20, the micro mirror driving voltage determination circuit 505 re-generates a micro mirror inclination table based on the micro mirror reference voltage value received from the storage circuit 504. In this case, the storage circuit 504 stores changed contents. As a result, the micro mirror inclination table is updated. In step S21, the processing circuit 212 terminates the adjustment for the micro mirror 209.

To avoid effects of the plane tilt of polygonal mirror 205, it is useful to perform the adjustment using a plane having no plane tilt. If there is any tilt on each plane, the adjustment is performed considering a tilt amount. Even in such a case, it is useful to perform the adjustment using the same plane.

Second Exemplary Embodiment

The exemplary device configuration illustrated in FIG. 1 includes the position sensing device (PSD) incorporated in the position detection sensor 211 for the adjustment of the micro mirror 209. However, the period of time during which the scanning light falls on the PSD may be insufficient for the PSD that requires a relatively long time to perform the position detecting processing.

Figure 10:
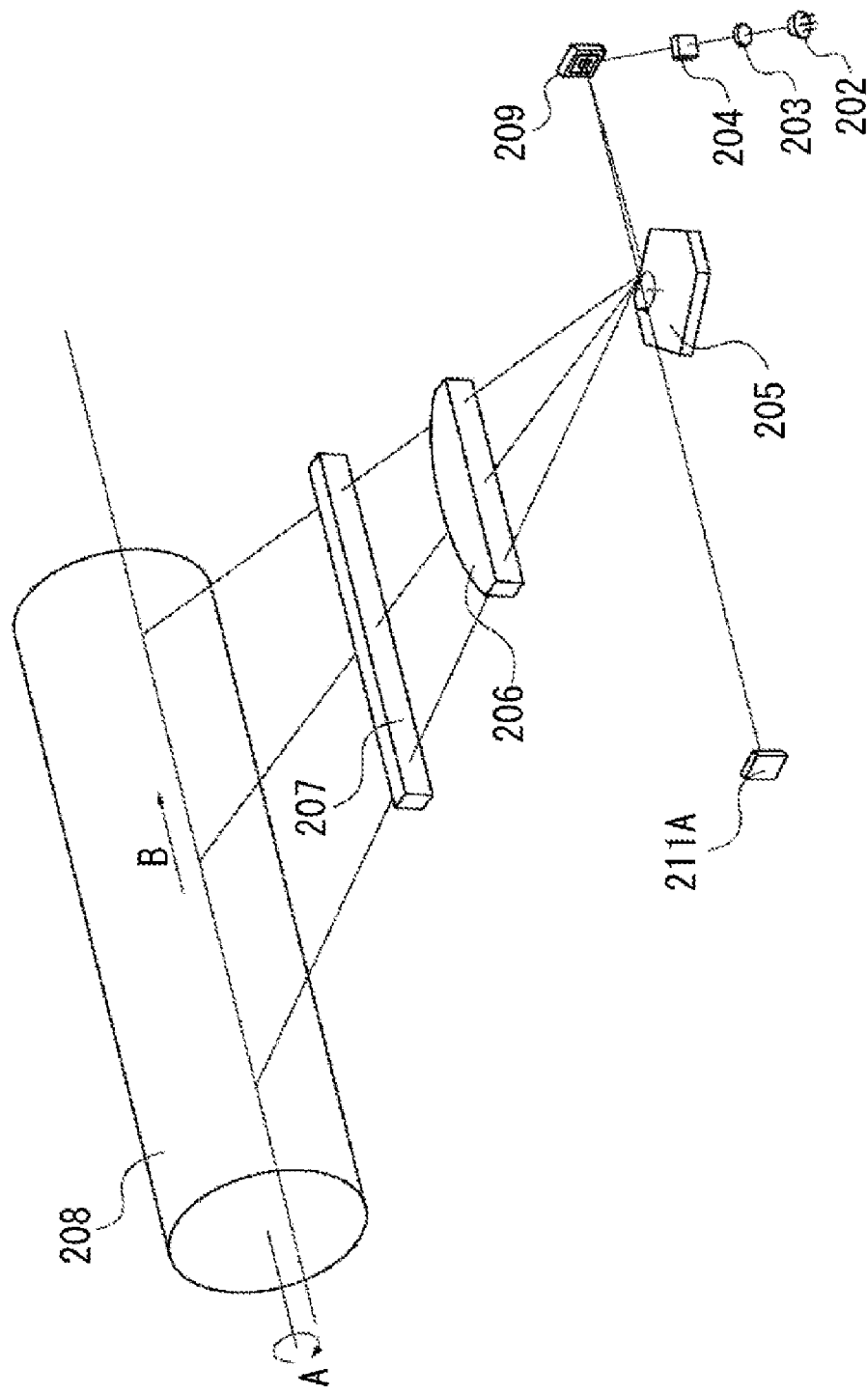
FIG. 10 illustrates an example optical scanning device according to a second exemplary embodiment of the present invention.

In view of the foregoing, as illustrated in FIG. 10, the second exemplary embodiment provides a position sensor (PSD) 211A at a position adjacent to the micro mirror 209 compared to the position sensor 211 illustrated in FIG. 1 (which is positioned near the photosensitive drum 208). The device configuration of the second exemplary embodiment can increase the time abeam of light falls on the position sensor 211A. Thus, the second exemplary embodiment can compensate a response delay of the position sensor 211A and accordingly improve the detection accuracy.

More specifically, reflection light from the micro mirror 209 has an angle greater than an angle of incident light that falls on the polygonal mirror 205. Thus, part of the reflection light from the micro mirror 209 advances straight beyond the polygonal mirror 205 and falls on the position sensor 211A. The position sensor 211A directly receive the reflection light from the micro mirror 209 (not the scanning light reflected on a scanning plane of the polygonal mirror 205).

Thus, the processing circuit 212 (see FIG. 1) can perform an adjustment of the micro mirror 209 without considering the plane tilt of the polygonal mirror 205. Furthermore, the position sensor 211A can detect the position of the reflection light from the micro mirror 209 without requiring a higher response speed. In this case, no beam of light falls on the photosensitive drum 208. Therefore, the processing circuit 212 can perform a tilt adjustment during an image formation operation.

Furthermore, the adjustment accuracy can be improved if the angle of inclination of the micro mirror 209 during the gradient adjustment is set to be greater than a plurality of angles of inclination used in the image formation.

Third Exemplary Embodiment

Figure 12:
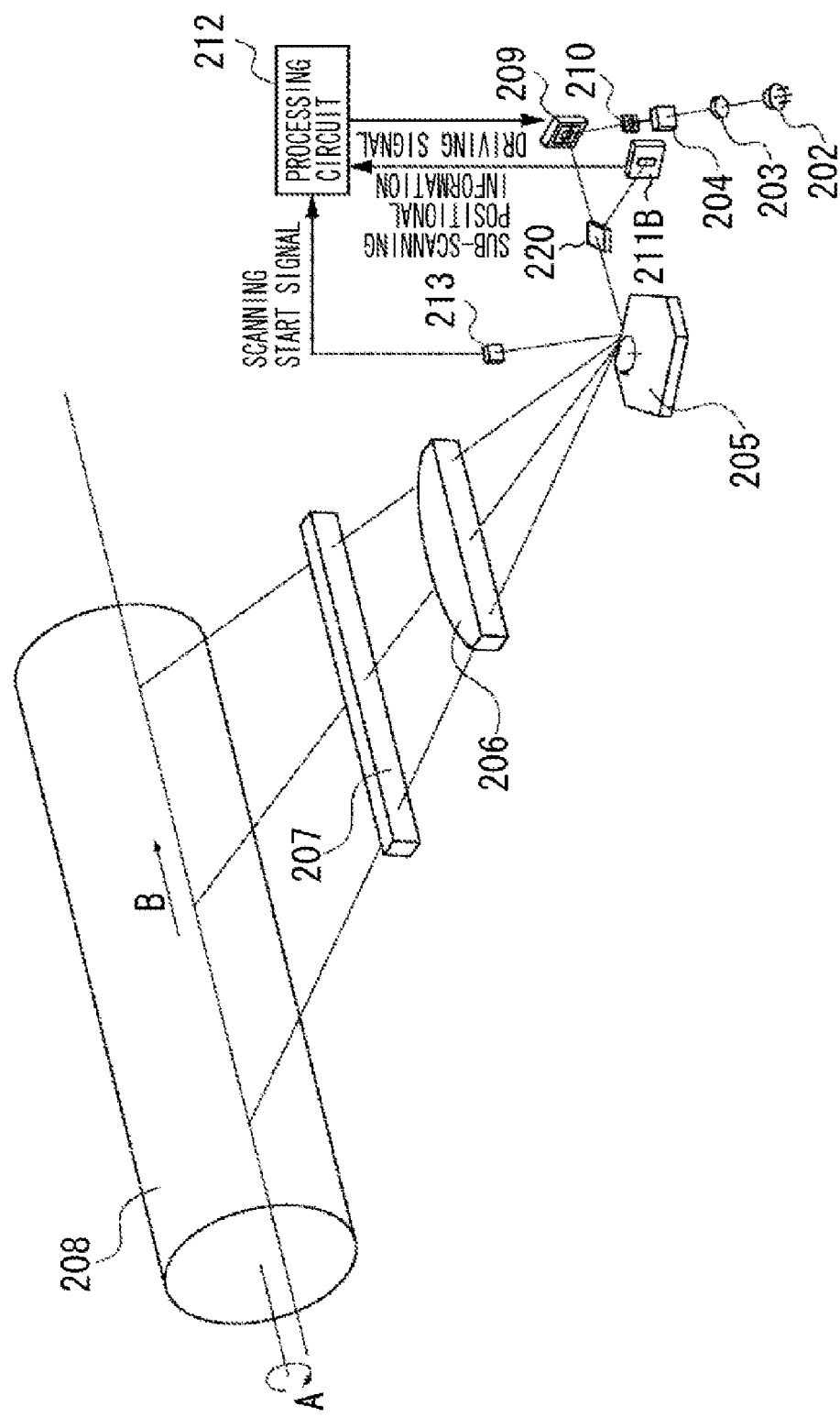
FIG. 12 illustrates an optical scanning device according to a third exemplary embodiment of the present invention.

As illustrated in FIG. 12, the third exemplary embodiment provides a half mirror 220 (i.e., light splitting unit) between the micro mirror 209 and the polygonal mirror 205. A position sensor (PSD) 211B is disposed at a position where a beam of light reaches before the polygonal mirror 205 deflects the beam. The position sensor 211B receives the reflection light from the micro mirror 209 (not the scanning light reflected on a scanning plane of the polygonal mirror 205).

Thus, the position sensor 211B can detect the position of the reflection light from the micro mirror 209 without requiring a higher response speed. The processing circuit 212 can perform an adjustment of the micro mirror 209 without considering the plane tilt of the polygonal mirror 205.

Fourth Exemplary Embodiment

In the first exemplary embodiment, if the input voltage to the micro mirror 209 is changed in step S16 or step S17 of FIG. 6, the micro mirror driving voltage determination circuit 505 re-generates a micro mirror inclination table in step S20. The fourth exemplary embodiment is different from the above-described first exemplary embodiment in that the micro mirror driving voltage determination circuit 505 selects an optimum one of inclination tables which are prepared beforehand.

Figure 11:
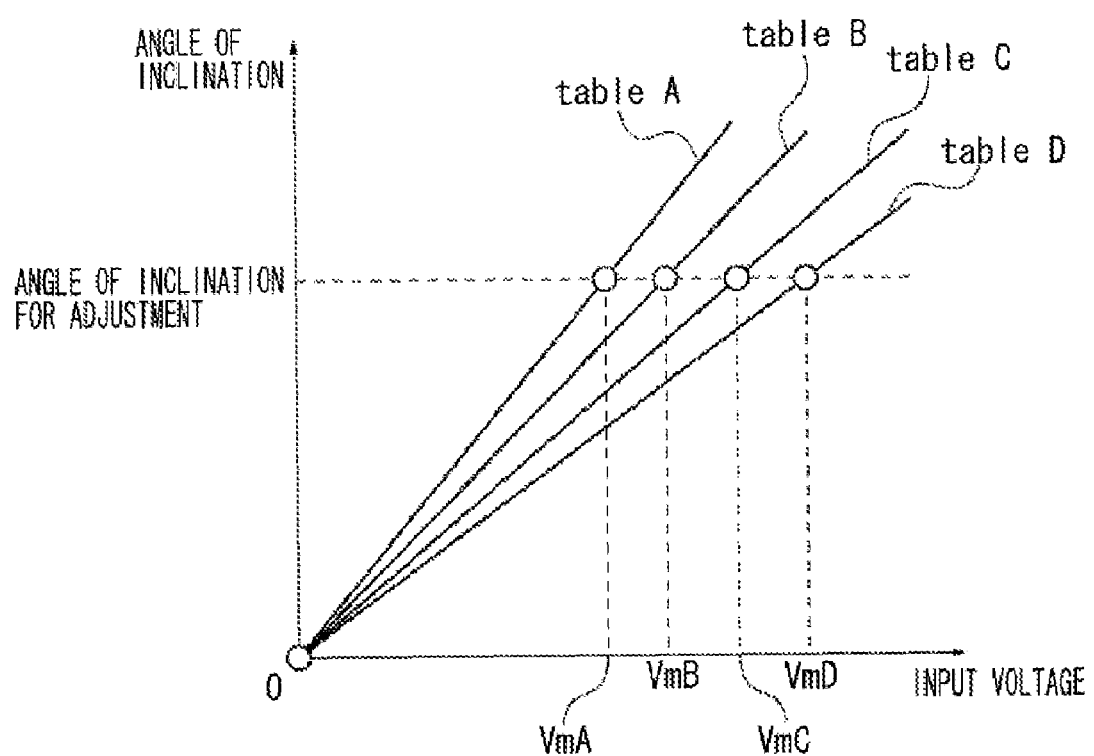
FIG. 11 illustrates an inclination table of a micro mirror according to a fourth exemplary embodiment of the present invention.

The fourth exemplary embodiment uses the device configuration illustrated in FIG. 1, and the processing circuit 212 has the configuration illustrated in FIG. 7. However, the storage circuit 504 according to the fourth exemplary embodiment stores two or more inclination tables each defining a relationship between the input voltage and the angle of inclination of the micro mirror 209. In the present exemplary embodiment, as illustrated in FIG. 11, the storage circuit 504 stores a total of four inclination tables (i.e., table A, table B, table C, and table D).

In step S10 of FIG. 6, the processing circuit 212 starts the angle of inclination adjustment for the micro mirror 209. In step S11, the voltage generation circuit 503 outputs an adjustment voltage value (e.g., gradient adjustment voltage value VmC on the table C) to the micro mirror 209.

In step S12, the light source 202 turns on at the timing the scanning light falls on the position detection sensor 211. When a beam of light falls on the position detection sensor 211, the position detection sensor 211 generates a PSD voltage value representing the position of irradiation. The sample-and-hold circuit 501 holds the detected PSD voltage value even after the beam of light has passed the position detection sensor 211.

In step S13, the comparison circuit 502 receives the present PSD voltage value held by the sample-and-hold circuit 501 and the target PSD voltage value stored in the storage circuit 504. The comparison circuit 502 determines whether the present PSD voltage value is equal to the target PSD voltage value (or determines whether a difference between the present PSD voltage value and the target PSD voltage value is within a predetermined error range).

If the present PSD voltage value is equal to the target PSD voltage value (or if the difference between the present PSD voltage value and the target PSD voltage value is within the predetermined error range), the comparison circuit 502 outputs the coincidence signal to the storage circuit 504.

In step S15, the micro mirror driving voltage determination circuit 505 generates a micro mirror inclination table based on the micro mirror reference voltage value received from the storage circuit 504. In this case, the storage circuit 504 stores the same contents. As a result, the micro mirror inclination table remains the same. In step S21, the processing circuit 212 terminates the adjustment for the micro mirror 209.

If the present PSD voltage value is not equal to the target PSD voltage value (or if the difference between the present PSD voltage value and the target PSD voltage value is out of the predetermined error range) (NO in step S13), the processing flow proceeds to step S14 to determine whether the present PSD voltage value is greater than the target PSD voltage value.

If it is determined that the present PSD voltage value is not greater than the target PSD voltage value (NO in step S14), the irradiation spot of a light beam is lower than the target position. The processing flow proceeds to step S16. In step S16, the comparison circuit 502 outputs the UP signal to the voltage generation circuit 503. The micro mirror driving voltage generated from the voltage generation circuit 503 increases from a gradient adjustment voltage value VmC on the table C to a gradient adjustment voltage value VmD on the table D according to the UP signal.

If it is determined that the present PSD voltage value is greater than the target PSD voltage value (YES in step S14), the irradiation spot of a light beam is higher than the target position. The processing flow proceeds to step S17. In step S17, the comparison circuit 502 outputs the DOWN signal to the voltage generation circuit 503. The micro mirror driving voltage generated from the voltage generation circuit 503 decreases from the gradient adjustment voltage value VmC on the table C to a gradient adjustment voltage value VmB on the table B according to the DOWN signal.

After the processing of step S16 or step S17 is terminated, the processing flow proceeds to step S18. In step S18, the light source 202 turns on at the timing the scanning light falls on the position detection sensor 211. When a beam of light falls on the position detection sensor 211, the position detection sensor 211 generates a PSD voltage value representing the position of irradiation. The sample-and-hold circuit 501 holds the detected PSD voltage value.

In step S19, the comparison circuit 502 receives the present PSD voltage value held by the sample-and-hold circuit 501 and the target PSD voltage value stored in the storage circuit 504. The comparison circuit 502 determines whether the present PSD voltage value is equal to the target PSD voltage value (or determines whether a difference between the present PSD voltage value and the target PSD voltage value is within a predetermined error range).

If the present PSD voltage value is equal to the target PSD voltage value (or if the difference between the present PSD voltage value and the target PSD voltage value is within the predetermined error range) (YES in step S19), the comparison circuit 502 outputs the coincidence signal to the storage circuit 504.

In step S20, the micro mirror driving voltage determination circuit 505 selects a desirable (specific) inclination table from plural inclination tables (stored beforehand) based on the micro mirror reference voltage value received from the storage circuit 504. In this case, the storage circuit 504 stores changed contents. As a result, the micro mirror inclination table is updated.

If the present PSD voltage value is not equal to the target PSD voltage value (or if the difference between the present PSD voltage value and the target PSD voltage value is out of the predetermined error range) (NO in step S19), the processing flow returns to step S14 to determine whether the present PSD voltage value is greater than the target PSD voltage value.

The processing circuit 212 repeatedly executes the processing of steps S14 to S19 until the present PSD voltage value agrees with the target PSD voltage value (or the difference between the present PSD voltage value and the target PSD voltage value decreases to the predetermined error range). If the determination in step S19 is positive, the processing flow proceeds to step S20.

In step S20, the micro mirror driving voltage determination circuit 505 re-selects a desirable (specific) inclination table from the plural inclination tables (stored beforehand) based on the micro mirror reference voltage value received from the storage circuit 504. In this case, the storage circuit 504 stores changed contents. As a result, the micro mirror inclination table is updated. In step S21, the processing circuit 212 terminates the adjustment for the micro mirror 209.

Other Exemplary Embodiments

Before executing the micro mirror adjustment in step S02, it is useful to decelerate the polygonal mirror drive motor to slow a beam of light passing on the position sensor 211. This embodiment can compensate response delay of the position sensor 211. In this case, after completing the micro mirror adjustment in step S02, it is useful to accelerate the polygonal mirror drive motor for the image formation.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-342824 filed Dec. 20, 2006, which is hereby incorporated by reference herein in its entirety.

What is claimed is:

1. An optical scanning device comprising:
a beam generating unit configured to generate a beam of light;
a scanning unit with a plurality of scanning planes configured to deflect the beam of light generated by the beam generating unit and cause the beam of light to scan an image carrier in a main-scanning direction;
a micro mirror configured to deflect the beam of light generated by the beam generating unit and thereby enable the deflected beam of light to fall on the scanning unit;
a position detecting unit configured to detect a position of the beam of light deflected by the micro mirror;
an input voltage control unit configured to control an input voltage value for inclining the micro mirror and thereby causing the beam of light to deflect; and
an input voltage determining unit configured to control the input voltage value controlled by the input voltage control unit according to a detection result obtained by the position detecting unit.

2. The optical scanning device according to claim 1, wherein the position detecting unit is disposed on a scanning line of the light deflected by the scanning unit.

3. The optical scanning device according to claim 1, wherein the position detecting unit is disposed on a scanning line of the light deflected by the scanning unit, wherein a distance from the beam generating unit to the position detecting unit is comparable to a distance from beam generating unit to the image carrier.

4. The optical scanning device according to claim 1, wherein the input voltage control unit causes the beam of light deflected by the micro mirror to fall on the position detecting unit at an angle greater than an angle of incident light that falls on the scanning unit.

5. The optical scanning device according to claim 1, wherein the input voltage determining unit selects one of a plurality of relational expressions each defining a relationship between an input voltage value of the micro mirror and an angle of inclination of the micro mirror which are prepared beforehand, based on control of the input voltage value by the input voltage control unit according to a detection result obtained by the position detecting unit, and determines an input voltage value of the micro mirror in an image formation operation based on a selected relational expression.

* * * * *